(12) United States Patent
Forrer, Jr. et al.

(10) Patent No.: US 7,660,978 B2
(45) Date of Patent: Feb. 9, 2010

(54) SYSTEM AND METHOD TO PROVIDE DEVICE UNIQUE DIAGNOSTIC SUPPORT WITH A SINGLE GENERIC COMMAND

(75) Inventors: Thomas R. Forrer, Jr., Round Rock, TX (US); Stephen A. Knight, Rochester, MN (US); Timothy J. O'Callaghan, Rochester, MN (US); Wayne D. Walters, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 11/683,117

(22) Filed: Mar. 7, 2007

(65) Prior Publication Data

US 2008/0222403 A1 Sep. 11, 2008

(51) Int. Cl.
*G06F 1/00* (2006.01)
(52) U.S. Cl. .................................. 713/1; 714/5; 707/100
(58) Field of Classification Search ..................... 713/1; 714/5; 707/100
See application file for complete search history.

(56) References Cited

U.S. PATENT DOCUMENTS

| 5,890,014 | A | * | 3/1999 | Long | 710/8 |
|---|---|---|---|---|---|
| 5,970,494 | A | * | 10/1999 | Velissaropoulos et al. | 707/102 |
| 6,711,574 | B1 | * | 3/2004 | Todd et al. | 707/100 |
| 7,310,742 | B2 | * | 12/2007 | Zimmer et al. | 714/5 |
| 7,392,336 | B2 | * | 6/2008 | Mimatsu et al. | 710/315 |
| 7,418,569 | B1 | * | 8/2008 | Lee et al. | 711/200 |

OTHER PUBLICATIONS www.santools.com/smartmon.html S.M.A.R.T. Disk Monitor "Optimize storage performance" Copyright 2000-2006 SANtools, Inc.

* cited by examiner

*Primary Examiner*—Chun Cao
(74) *Attorney, Agent, or Firm*—Cantor Colburn LLP

(57) ABSTRACT

An embodiment of this invention provides a system and method for a diagnostic computer application executing on a host computer to extract vendor unique diagnostic information from an attached peripheral device. The peripheral device is pre-configured to respond with device unique information in response to certain standard interface protocol inquiries. Standard interface inquiry commands are used to extract detailed instructions from the device. These instructions may contain device unique small computer system interface (SCSI) command sequences, for example. The command sequences allow a user of the host computer to extract detailed data from the peripheral device about the peripheral device's operational, performance and health statistics.

5 Claims, 3 Drawing Sheets

FIGURE 2

HOST DEVICE INTERFACE MODULE 140

112 COMMAND DESCRIPTOR BLOCK

COMMAND PHASE 150

| BYTE | DEFINITION | | |
|---|---|---|---|
| 0 | INQUIRY CODE | 0x12 | 154 |
| 1 | FLAGS | 0x01 (EVPD BIT) | 156 |
| 2 | PAGE CODE | 0xCA | 158 |
| 3 - 4 | DATA LENGTH | 0x1000 (Bytes) | 160 |
| 5 | CONTROL | 0 | 162 |

112 COMMAND DESCRIPTOR BLOCK

INQUIRY PAGE 0xCA DATA 170

| BYTE | DEFINITION | |
|---|---|---|
| 0 | 0 (reserved) | 172 |
| 1 | PAGE CODE (Cah) | 174 |
| 2 | 0 (reserved) | 176 |
| 3 - 4 | ADDITIONAL LENGTH = N-3 | 178 |
| | Sequence$_1$ Record | 180 |
| | Sequence$_2$ Record | 182 |
| N | | |

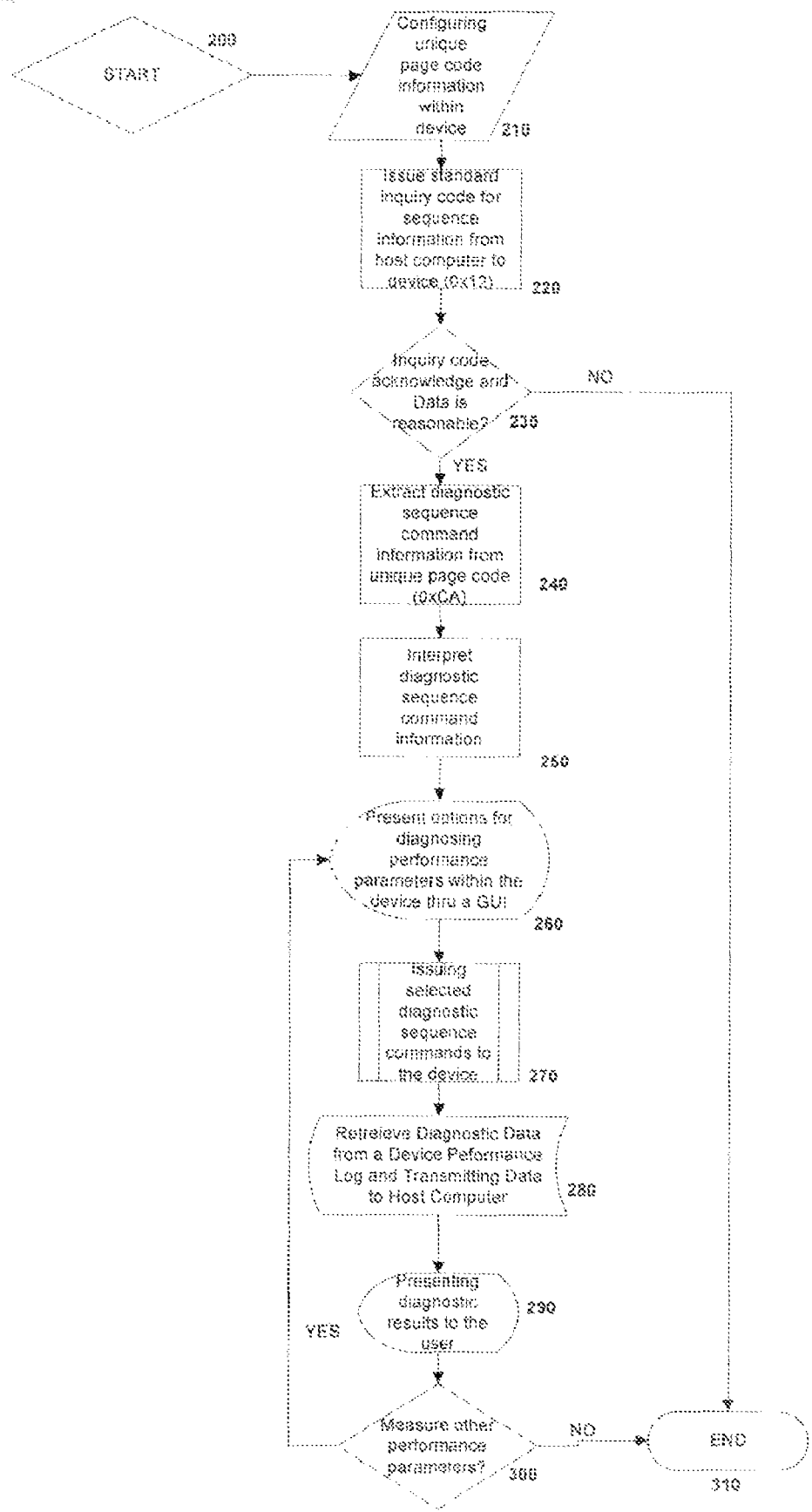

SYSTEM AND METHOD TO PROVIDE DEVICE UNIQUE DIAGNOSTIC SUPPORT WITH A SINGLE GENERIC COMMAND

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to extracting diagnostic information from a hard drive and, more specifically to a method of providing a device unique diagnostic support with a single generic command.

2. Description of Background

Peripheral devices such as disk drives are controlled by firmware, which resides within the device itself. This firmware controls the behavior of the device and can be modified if new behaviors are needed or bugs are found in the current version of firmware.

These devices are typically designed to maintain a log within the device that collects and records a number of operational, performance and health parameters and the paths taken through their firmware so that, if problems occur, there is a record log to inspect in order to trouble shoot the problem. This diagnostic information is recorded onto the device itself usually in non-volatile storage. Some of the information that may be collected from the device may conform to standards; however, much of the information needed from the device for debugging is unique to the manufacturer or vendor of the device. Furthermore, the detailed command sequences needed to be issued to collect this vendor unique information is also unique to the vendor. Thus, when a device is returned to a vendor, that specific vendor can use their own tools to extract this information to debug the problem.

If the hard drive is installed in an end user system, extracting this same information becomes much more difficult. The customer may have to physically remove the device and ship it to the vendor or manufacture of the device. Otherwise, the vendor may need to attach their own tools to the end user system or they may need special diagnostic tools developed for that specific customer environment to gain access to this data. Neither of these solutions is very practical or perhaps even possible in many high performance server environments.

Therefore, the problem becomes how to provide a generic method to extract vendor unique diagnostic information from a peripheral device without having to physically remove the device from the system or attach special tooling to the customer system.

SUMMARY OF THE INVENTION

An exemplary embodiment of the present invention provides a host computer system for extracting diagnostic information a hard drive device using a hard drive device interface. The system includes a memory of the hard drive device, configured during its manufacturing process, with page code information containing vendor unique diagnostic sequence command information for retrieving at least one of operational, performance and health data stored within the hard drive device. A memory of the hard drive device configured to measure and record a performance log data file containing measured operational, performance and health data of the hard drive device. The host computer connected to the hard drive through a hard drive device interface so that the host computer has operational control over the hard drive device.

In the exemplary embodiment a process resides on the host computer including instructions to issue from the host computer through the hard drive interface an inquiry command to the hard drive device to retrieve the page code information. The host computer then extracts from the hard drive device the page code information containing the vendor unique diagnostic sequence command information. The host computer interprets the vendor unique diagnostic sequence command information within the host computer and presents a plurality of selectable options for diagnosing operational, performance and health parameters within the peripheral device to a user via a graphical user interface.

The host computer also issues one or more corresponding selected vendor unique diagnostic sequence commands via the hard drive device interface, so that operational, performance and health parameters within the hard drive device can the retrieved from the performance log data file within the hard drive device. The host computer then presents the retrieved performance log data to the user via the graphical user interface, wherein the user can observe via the graphical user interface, one or more operational, performance and health parameters to measured within the hard drive device.

A further exemplary embodiment provides a method for using peripheral device interface commands for extracting diagnostic information from a peripheral device. The method includes configuring a memory of the peripheral device with page code information containing vendor unique diagnostic sequence command information for retrieving operational, performance and health data stored within the peripheral device. The peripheral device is attached to a host computer thru the peripheral device interface so that the host computer has operational control over the peripheral device. The method further comprises measuring and recording within a memory of the peripheral device a performance log data file containing measured operational, performance and health data of the peripheral device.

Further in the exemplary embodiment, the method includes issuing from the host computer through the peripheral device interface an inquiry command to the peripheral device to retrieve the page code information. The page code information is used for extracting vendor unique diagnostic sequence command information. The host computer interprets the vendor unique diagnostic sequence command information to provide menu entries via a graphical user interface, for user selection of one or more operational, performance and health parameters to retrieve from the performance log data file of the peripheral device. Next, the host computer issues one of more corresponding vendor unique diagnostic sequence commands via the peripheral device interface, so that the selected operational, performance and health parameters can the retrieved from the performance log data file within the peripheral device. The retrieved performance log data is presented to the user via the graphical user interface.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that provides a system and method for a diagnostic computer application executing on a host computer to extract vendor unique diagnostic information from an attached peripheral device. The peripheral device is pre-configured to respond with vendor unique information in response to certain standard interface protocol inquiries. These standard interface inquiry commands are used to extract detailed paged code instructions from the device. These page code instructions may contain device unique small computer system interface (SCSI) command sequences, for example. Theses SCSI command sequences are interpreted and presented to a user via a graphical user interface. The user is able to select various operational, performance and health statistics of the peripheral device to measure. The selected data is extracted from a log record stored within a memory of the peripheral device and presented to the user via the graphical user interface.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a block diagram of an embodiment of the command descriptor block information.

FIG. 3 is a flowchart of an embodiment of the page code extraction method.

Figure 1:
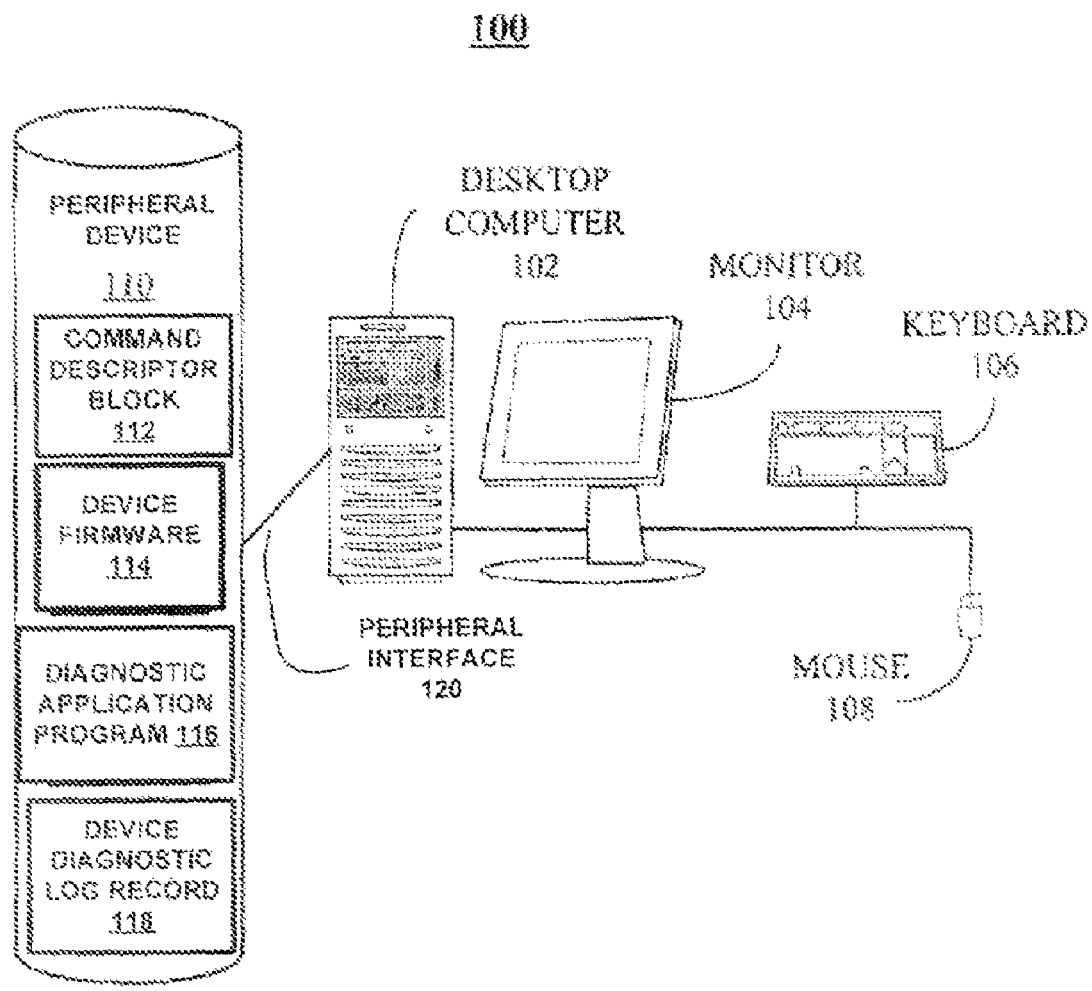
FIG. 1 is a block diagram of a computing system architecture in accordance with exemplary embodiments.

The detailed description explains the preferred embodiments of the invention, together with advantages and features, by way of example with reference to the drawings.

DETAILED DESCRIPTION OF THE INVENTION

Although described with particular reference to an application backup system in the Windows operating system, published by the Microsoft Corporation of Redmond, Wash., the claimed subject matter can be implemented in any information technology (IT) system where it is desirable to obtain peripheral device performance and diagnostic information. Further, the claimed subject matter is not restricted to hard drive applications. The same process may apply to floppy disk, optical, flash and other SCSI or AT Attachment (ATA) based devices. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC), server or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example, the following: a portable computer diskette, a random access memory (RAM), a read-only memory (ROM), an erasable programmable read-only memory (EPROM or flash memory), and a portable compact disk read-only memory or another suitable medium upon which a program and/or data may be stored. In an exemplary embodiment, a non-volatile memory is used.

Exemplary embodiments include a system and method for using a peripheral device interface protocol for extracting diagnostic information from the peripheral device for use on the host computer. In an exemplary embodiment, a small computer systems interface (SCSI) protocol is used. However, other device interface protocols may also be used. The system, method and apparatus include a peripheral device having unique SCSI inquiry data gape code information configured within the peripheral device. The peripheral device interface attaches the peripheral device to the host computer so that the host computer has operational control over the peripheral device. The peripheral device contains internal software for measuring and recording within a memory of the peripheral device, a performance log record data file which contains measured operational, performance and health data of the peripheral device. In general, once the user selects a parameter to inspect, the corresponding diagnostic sequence commands are issued through the peripheral interface to the peripheral device to retrieve data from the performance record log within the peripheral device that contains measured operational, performance and health data. The data retrieved is presented to the user in a graphical user interface.

Turning now to the figures, FIG. 1 is a block diagram of exemplary computing system architecture 100. A desktop computer 102 includes a monitor 104, a keyboard 106 and a mouse 108, which together facilitate human interaction with computer 102. Attached to computer 102 is a hard drive storage component 110, which is incorporated into the computer 102 i.e. an internal device, or attached externally to the computer 102 by means of various, commonly available peripheral interface protocols 120 such as but not limited to, small computer systems interface (SCSI), a universal serial but (USB) port. Serial Attached SCSI (SAS). Fiber Channel (FC), or an IEEE 1394 (FIREWIRE) port. The only requirement is that the peripheral device can support the SCCSI Command Set.

In this example, data storage 110 stores in an exemplary application, command descriptor block 112, device firmware 114, diagnostic application program 116, and performance data log record 118. The command descriptor block 112, device firmware 114 and the performance data log 118 are used as example in the following description. It should be understood that a typical computer system has multiple application files, configuration files and data files. Configuration files include, but are not limited to, application configuration files, operating system (OS) configuration files, and various registries for the storage of information on the resources of computer 102. In an exemplary embodiment, the diagnostic application program 118 is described in more detail below in conjunction with FIGS. 1-3.

Referring to FIG. 1, in an exemplary embodiment SCSI devices use a standard protocol in the firmware 114 for communicating to the host computer. The part of the SCSI protocol that contains the data that controls the operation of the peripheral device is called the command phase. The process instructions contained in the SCSI device that control the operation on the device is packaged in a data structure called a Command Descriptor Block (CDB) 112.

Referring to FIG. 2, the CDBs 112 vary in the number bytes (size) and are dependent on the operation that is being expressed. The first byte of the CDB 112 defines the operation (inquiry) code 154. There are several operation codes 154 for describing actions such as read data, write data, seek, format unit, download firmware, etc. Each operation code 154 can have several parameters associated with it, which are part of the CDB 112 and further described the details of the action to take place. These operation codes 154 and their associated parameters are well defined and are standard for all devices. The SCSI protocol, however, leaves room for vendors to define their own unique commands for their own purposes. Hence, it is not uncommon for vendors to defined their own command sequences for diagnostic purposes.

An exemplary embodiment of the present invention uses a standard operation code called an inquiry command code (0x12) (discussed in greater detail at step 220 in FIG. 3). The single inquiry command, allows the host computer to retrieve additional SCSI command sequences from the device that describes how to retrieve vendor unique information. The inquiry command has a parameter that defines exactly what type of inquiry data is being requested from the device. This parameter is called the page code and is discussed in greater detail at step 240 in FIG. 3. Page code information contains diagnostic sequence command information for retrieving operational, performance and health information about the device. A standard operation code inquiry from the host computer is issued through the peripheral interface to the peripheral device to retrieve the unique page code information. The standard operation code inquiry retrieves the unique page code information. The standard operation code inquiry retrieves the unique page code information that is specific to the peripheral device. The unique page code information contains diagnostic sequence command information, wherein the diagnostic sequence command information is interpreted within the host computer to present the user with a plurality of selectable options for diagnosing operational, performance and health parameters of the peripheral device. Up to 256 page codes are possible but only a few are standard and are used by any give peripheral device. Inquiry page codes 0xC0-0xFF are defined as vendor specific, which means vendors can use them for their own purposes. In an exemplary embodiment, the implementation of this process takes advantage of vendor specific code pages by using the standard page code 0xCA, shown in step 240, as the mechanism to obtain information from the SCSI device that describes which SCSI commands are required to retrieve vendor unique data.

The use of specific command sets and page codes described herein are for demonstration purposes only. For example, the page code OxCA is not required to extract information from the device as any page code in the "vendor unique" range could be used. The process could also be implemented with different page codes. Similarly, the SCSI command set is not required, the system and method may be applicable to ATA and other device interface protocols. Therefore, specific SCSI commands and pages codes referenced herein, describe at least one embodiment of the invention.

Referring again to FIG. 1 and the flow chart in FIG. 3, in an exemplary embodiment the peripheral device 110 is configured with unique page code information shown in step 210. The host computer 102 issues a standard inquiry code for sequence information (0x12) to the device, as shown in step 220. If the device 110 does not recognize the standard inquiry code shown in step 220, the operation terminates at step 310.

However, if the peripheral device 110 acknowledges the standard inquiry, it interprets a parameter in the page code (OxCA) shown at step 240, which instructs the peripheral device 110 to allow the host computer 102 to extract diagnostic sequence command information from the CDB 112, which is stored within the peripheral device 110. The host computer 102 interprets the diagnostic sequence command information seen at step 250, which defines how commands should be issued to obtain vendor unique information. The diagnostic application program executes on the host computer 102 and interprets the diagnostic sequence command information shown in step 250. The host computer encodes this interpreted information into a graphical user interface seen at step 260 to present to the user a number of options for diagnosing operational, performance and health parameters of the peripheral device 110. The user selects the operational, performance and health parameters of concern and the host computer 102 issues the corresponding, selected diagnostic sequence command seen in step 270 to the device 110. The device responds to these commands by retrieving the diagnostic data from a performance log record data file 116 within the peripheral device 110 and transmits diagnostic data shown in step 280 to the host computer 102. The host computer interprets this data and presents the results to the user in the graphical user interface seen at step 290. The user may then decide to measure other parameters shown at step 300 or to terminate the operation at step 310.

Referring to FIG. 2, the inquiry command needed to retrieve the 0xCA inquiry page is shown in the "Command Phase" 150. Here byte 0 is the operation code 154, byte 1 contains flags 156, byte 2 contains the inquiry page code 0xCA 158, which is followed by the data length information 160 in bytes 3 through 4. Byte 5 contains the control bit 162.

One way for the host system to determine if the computer supports inquiry data page 0xCA is to issue an inquiry SCSI CDB for the page. If the peripheral device 110 rejects the command with sense data indicating invalid data in the CDB then the peripheral device 110 does not support the 0xCA Page. Another way to accomplish is to issue the inquiry data command requesting a list of pages that the device supports. The 0xCA page must be in this list if it is supported.

After it has been determined that inquiry page 0xCA is present and contains reasonable data, the content of this page defines how commands should be issued to obtain vendor unique information. The following in TABLE 1 is the format of the data that is returned by Inquiry Page 0xCA in an exemplary embodiment of this invention.

TABLE 1

| INQUIRY PAGE 0xCA DATA | |
|---|---|
| Bytes | Definition |
| 0 | 0 (reserved) |
| 1 | Page Code (CAh) |
| 2 | 0 (reserved) |
| 3-4 | Additional Length = N − 3 |
| | Sequence$_1$ Record |
| | Sequence$_2$ Record |
| N | |

Here, "Page Code" is a value 0xCA and used to identify that this page is indeed 0xCA inquiry data. Bytes 3 and 4 contain "Additional length," which is the length in bytes of the remainder of the inquiry page. The remaining bytes contain the "Sequence Record," which is a data structure that defines a set of command sequences that can be issued against this device to obtain vendor specific diagnostic data. A given inquiry page may contain multiple "Sequence Records."

Table 2 below is an exemplary embodiment of the format of the data returned by a "Sequence Record." Here, the "Sequence Record Length" is the length of the sequence record including the record length bytes. In an exemplary implementation, the "Sequence Identifier" is an 8 byte ASCII field used to identify this specific sequence. The "Sequence Record Length" is used to verify that the data immediately following this identifier is indeed a valid sequence and is also a way for a vendor to have multiple sequences defined within a single inquiry page. The diagnostic application that has knowledge of this inquiry page only needs to extract the sequence identifier of the command sequence being requested and a data buffer to receive the operational, performance and health diagnostics from the peripheral device. Finally, the "CDB Record" describes the command descriptor block along with direction and data length specifications to send a single command to the device.

TABLE 2

| SEQUENCE RECORD | |
|---|---|
| 0-1 | Sequence Record Length (2 bytes) (Y + 1) |
| 2-9 | Sequence Identifier (8 bytes ASCII) |
| 10 | CDB Record$_1$ |
| . | CDB Record$_2$ |
| . | ... |
| . | CDB Record$_y$ |
| Y | |

Table 3 provides the structure and more detail about the CDB Record. Here the "CDB Record Length" is the length of the CDB record including the record length byte. The "ASCII Eye Catcher" is 6 bytes of ASCII code that denotes the command. The "ASCII Eye Catcher" may be pre-pended to the data returned from the command by the application for ease of locating. Mode is a 3 bit field with the allowed values of "0=No Data," "1=Data In," "2=Data Out," "3=Data Out (Mask off and OR)." The "CDB Length" is a 5-bit value for the length of the CDB bytes. "AddnlDataLengthRecvLoc" is the bit offset from the beginning of the data received that is the location of the Additional Data Received field. The Additional Data Received field represents the number of bytes in the returned data that immediately follow this field. AddnlDataLengthRecvLoc is used when the mode=Data In (read operation) and AddnlDataLengthRecvSize is not zero. For example, a value of 16 would indicate the Additional Data Received field would start on byte 2 of the data received.

"AddnlDataLengthRecvSize" is the number of bits that represent the Additional Data Received field that is located in the data received. For example a value of 8 would indicate a byte field and 32 would indicate a unit 32. This value cannot exceed 32 (4 bytes). If this field contains a value of 0, then the data length field represents the number of bytes received on a data in command type.

"Data Length" is the maximum amount of data to be transferred by this command. If Mode=0 (no data), this field is ignored. If Mode=1 (data in), this is the buffer size the hose should provide. If Mode=2 (data out), the host provides the amount of data, that is, "data out" to be sent to the device. If Mode=3 (mask off and or), the mask and data out bytes will be the length indicated by the "Data Length" field. Since this mode works on the data from the previous command in the sequence, this data length must NOT be larger than the data length of the previous command. Finally, the "CDB Bytes" are the command descriptor block bytes for the command.

TABLE 3

| CDB RECORD | |
|---|---|
| 0 | CDB Record Length (X + 1) |
| 1-6 | ASCII Eye Catcher (6 byte) |
| 7 | Mode (3 bits)CDB Length (5 bits) |
| 8 | Additional DataLength Recv Loc |
| 9 | Additional DataLength Recv Size |
| 10 | Data Length MSB |
| 11 | Data Length |
| 12 | Data Length |
| 13 | Data Length LSB |
| 14 – (13 + Z) | CDB Bytes (Z) |
| (Z + 14) – (Z + 13 + DL) | Data Out Bytes (Data Length) |
| (Z + 13 + DL) – X | Mask Bytes (Data Length) |

The "Mask Bytes" shown in Table 3 are valid mode=3. When Mode is Data Out (Mask Off and OR data), the mask bytes must be of the length indicated by the "Data Length" field. This mask is used to turn OFF bits in the data received by the previous command. For each 1 bit in the mask, the corresponding bit in the data received in the previous command will be turned OFF. Table 4 below provides an example of how the "Mask Bytes" are used in an exemplary embodiment.

TABLE 4

| EXAMPLE OF DATA OUT (MASK OFF AND OR DATA) | |
|---|---|
| Process | Data Returned |
| Mode sense for page 7 and result | 02 04 21 34 45 33 |
| Apply (off) mask | (00 00 00 00 F0 00) |
| Result of applying mask | 02 04 21 34 05 33 |
| OR Data Out (with result) | 00 00 00 00 50 00 |
| Result of OR'ed Data Out | 02 04 21 34 55 33 |
| Mode Select using resulting data | 02 04 21 34 55 3 |

The "Data Out Bytes" shown in Table 3 and 4 are valid when mode=2. The data out bytes must be of the length indicated by the "Data Length" field. The data out bytes are transferred to the device in a data out phase. For the Data Out (Mask Off and OR data) mode, the Data Out bytes are OR'ed with the data received by the previous command (after the mask has been applied) and the result is sent to the peripheral device in a data out phase.

The end user does not need to have any knowledge of the inner working of the CDBs. The diagnostic application program implements these processes. Therefore, the definition of the CDBs and data content that flows between the peripheral device and the host computer are interpreted internally via algorithms process within the host computer. These commands and the resulting data that flows between the peripheral device and the host computer are defined by the manufacture of the peripheral device before hand. Individual peripheral devices may have a unique CDB. Therefore, all the host application needs to know to retrieve this data is the vendor unique command sequences, which can be retrieved, for example, through the generic inquiry page code.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

The invention claimed is:

1. A host computer system for extracting diagnostic information a hard drive device using a hard drive device interface, a system comprising:
   a memory of the hard drive device, configured during its manufacturing process, with page code information containing vendor unique diagnostic sequence command information for retrieving at least one of operational, performance and health data stored within the hard drive device, the memory of the hard drive device further configured to measure and record a performance log data file containing measured operational, performance and health data of the hard drive device;
   the host computer connected to the hard drive through a hard drive device interface so that the host computer has operational control over the hard drive device and a process residing on the host computer including instructions to:
      issue from the host computer through the hard drive interface an inquiry command to the hard drive device to retrieve the page code information;
      extract from the hard drive device the page code information containing the vendor unique diagnostic sequence command information;
      interpret the vendor unique diagnostic sequence command information within the host computer and presenting a plurality of selectable options for diagnosing operational, performance and health parameters within the peripheral device to a user via a graphical user interface;
      issue one or more corresponding selected vendor unique diagnostic sequence commands via the hard drive device interface, so that operational, performance, and health parameters within the hard drive device can the retrieved from the performance log data file within the hard drive device; and
      present the retrieved performance log data to the user via the graphical user interface, wherein the user can observe via the graphical user interface, one or more operational, performance and health parameters to measured within the hard drive device.

2. A method for using peripheral device interface commands for extracting diagnostic information from a peripheral device, the method comprising:
   configuring a memory of the peripheral device with page code information containing vendor unique diagnostic sequence command information for retrieving operational, performance and health data stored within the peripheral device;
   attaching the peripheral device to a host computer thru the peripheral device interface so that the host computer has operational control over the peripheral device;
   measuring and recording within a memory of the peripheral device a performance log data file containing measured operational, performance and health data of the peripheral device;
   issuing from the host computer through the peripheral device interface an inquiry command to the peripheral device to retrieve the page code information;
   extracting vendor unique diagnostic sequence command information from the page code information;
   interpreting said vendor unique diagnostic sequence command information within the host computer to provide menu entries via a graphical user interface, for user selection of one or more operational, performance and health parameters to retrieve from the performance log data file of the peripheral device;
   issuing one or more corresponding vendor unique diagnostic sequence commands via the peripheral device interface, so that the selected operational, performance and health parameters can the retrieved from the performance log data file within the peripheral device; and
   presenting the retrieved performance log data to the user via the graphical user interface.

3. The method according to claim 2, wherein the peripheral device interface uses a small computer system interface protocol or AT attachment protocol.

4. The system according to claim 1, wherein the hard drive device interface uses a small computer system interface protocol, a universal serial bus protocol or an IEEE 1394 protocol.

5. The system according to claim 1, wherein the page code is any page code within the vendor unique range in the small computer system interface protocol standard.

* * * * *